3,338,607
EXTENSIBLE HANDLE
Joseph D. Broadhurst, Jr., Lexington, Ky., assignor to Westinghouse Air Brake Company, Wilmerding, Pa., a corporation of Pennsylvania
Filed Dec. 21, 1964, Ser. No. 419,892
5 Claims. (Cl. 287—58)

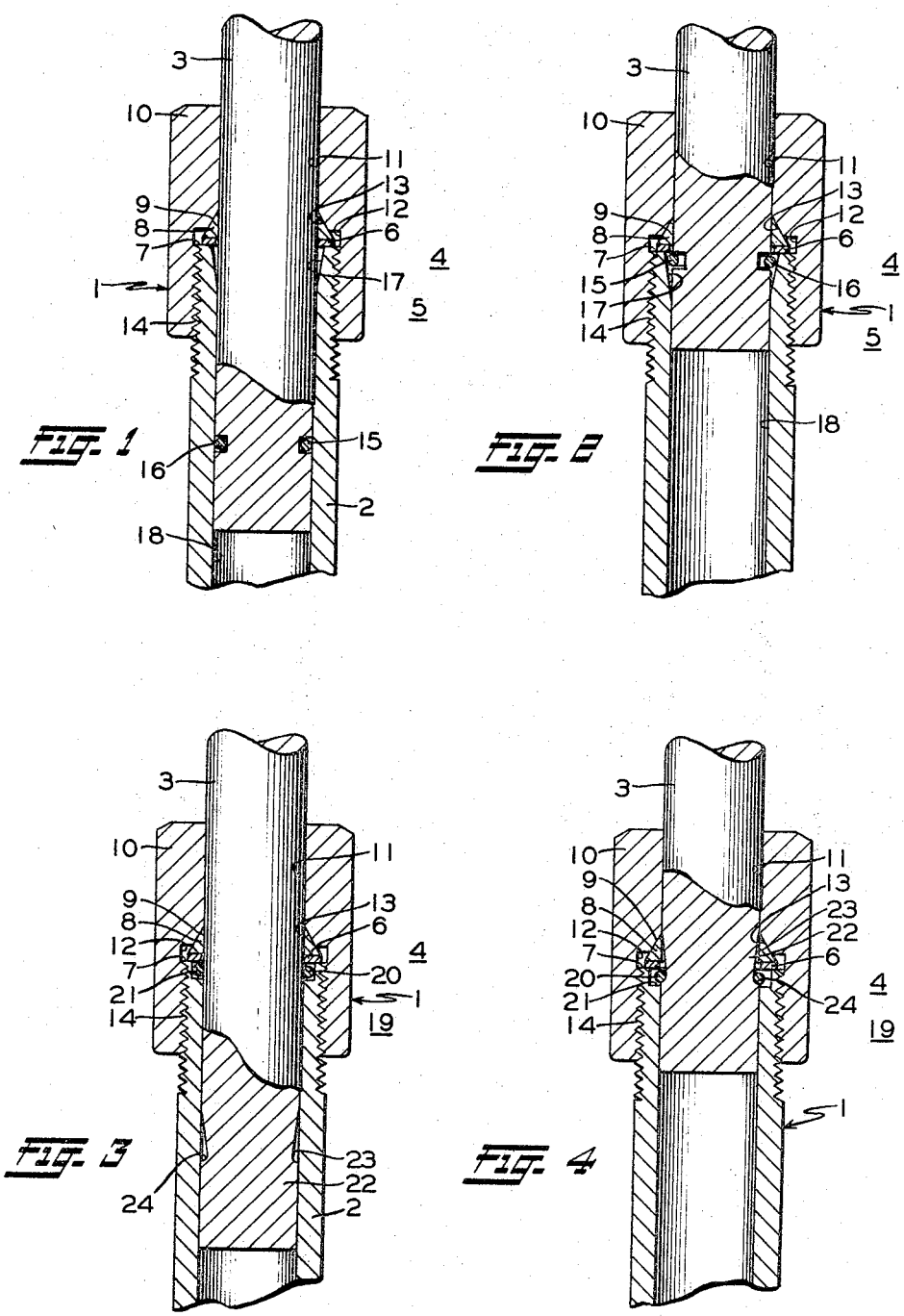

This invention relates generally to an extensible handle for effecting manual operation of mechanical devices, and relates perticularly to a telescoping handle having means for locking the handle in any extended position and having means for limiting maximum extension thereof to prevent separation of the telescoping members of the handle.

Heretofore, there have been proposed a wide variety of extensible handles comprised of telescoping members. However, by and large, these mechanisms are either relatively complicated or unduly delicate.

It is the object of the present invention to provide in an extensible handle a simple, yet sturdy, inexpensive means operable under heavy industrial duty conditions for locking the telescoping handle members in any selected extended position thereof and including a simple sturdy limit means for preventing separation of the telescoping members when the telescoping members have reached a maximum extended position.

In the present invention, this object is achieved by a pair of telescopically related handle members which may be releasably fixed in any extended position by means of radially stressable gripping means annularly disposed on one of the members and operable to grip or release the one member in response to the movement of a nut sleeved over the one member and threadedly received on the end of the other handle member. The nut includes camming means for laterally stressing the gripping means into gripping engagement with the one member when the nut is moved in one direction on the other member and operable to release the stress so applied to the gripping means to release the one member when the nut is moved in the opposite direction. In order to establish a maximum extended position between the handle members and prevent separation of the handle members, a spring means is disposed in a depression on one member and biased for engagement with a depression on the other member when the two depressions are juxtaposed at the maximum extended position. A camming surface is disposed on the other member in association with the depression thereon for disengaging the spring from the depression on the other member when the pair of extended members are moved from the maximum extended position to any other position.

These and other objects will become more readily apparent when taken in conjunction with the following description and drawings, in which:

FIG. 1 is a cross-sectional view of an extensible handle showing the telescoping members thereof in a partially extended position;

FIG. 2 is a cross-sectional view of the handle of FIG. 1 showing the handle members in a maximum extended position;

FIG. 3 is a cross-sectional view of a modification of the extensible handle of FIGS. 1 and 2, and showing the handle in a partially extended position, and FIG. 4 is a cross-sectional view of the extensible handle of FIG. 3 showing the telescoping members thereof in a fully extended position.

Referring now to FIGS. 1 and 2 of the drawings, there is shown an extensible handle generally indicated at 1 and comprising a first hollow handle member 2 intended for attachment at its lower end to a movable part of an operating mechanism (not shown), a second handle member 3 telescopically received and axially movable within the first handle member 2, a releasable locking means generally indicated at 4 for releasably locking handle members 2 and 3 in any selected extended position, and a limit means generally indicated at 5 for establishing a maximum extension limit between handle member 2 and 3.

The releasable locking means 4 comprises a washer 6 of suitable hard material, such as steel, slidably sleeved over the handle member 3 and disposed in engagement with the upper flat end 7 of handle member 2, an annular resilient member 8 having an outer periphery 9 tapered upwardly and inwardly and sleeved over the handle member 3 in engagement with washer member 6, and a nut 10 having an internally threaded axial bore 11, a counterbore 12, and an upwardly and outwardly sloping annular cam surface 13 disposed between the bore 11 and the counterbore 12.

In the operation of the releasable locking means 4, the nut is sleeved over the handle member 3 with the threaded bore 11 cooperating with external threads 14 on the upper end of handle member 2 to facilitate axial movement of the nut on handle member 2. It will be observed that downward movement of nut 10 relative to handle member 2 effects downward movement of the cam surface 13 to effect engagement thereof, with annular member 8 providing a radially inward resultant squeezing force between the cam 13 and washer 6 to effect radially inward movement of resilient member 8 into a gripping engagement with handle member 3 to lock the latter into the selected position with respect to member 2. Alternatively, it will be observed that, thereafter, upward movement of nut member 10 disengages cam surface 13 from annular member 8 to release the member 3 for facilitating a manual repositioning of handle member 3 relative to handle member 2, as desired.

The annular resilient member 8 may comprise an expansion ring having a split side composed of any suitable spring material, such as brass, or, if desired, may be comprised of a continuous annular member composed of a suitable resiliently compressible material, such as hard fiber or hard rubber. In this application, the term expansion ring refers to an annular member which exerts a radially expanding force when subject to the stress of an externally applied radially contracting force.

The limit means 5 for establishing a maximum extended position between the handle members 2 and 3 comprises an expansion ring 15 composed of any suitable material, such as steel, disposed in a depression in the form of an annular recess 16 on the lower end of handle member 3 for cooperating with a depression in the form of a flared or tapered opening 17 to bore 18 in member 3.

In the operation of the limit means 5, and referring to FIG. 1, when the member 3 is positioned relative to handle member 2 in any position other than the upper limit position, expansion ring 15 is entirely disposed in recess 16 and slides on the inner surface of bore 18, thus having no effect on relative movement between the handle members 2 and 3 other than a slight binding action. Referring to FIG. 2, it will be seen that extension of the handle member 3 to its maximum limit with respect to handle member 2 juxtaposes recess 16 with the flared bore opening 17, thus permitting expansion of expansion ring 15 to partially emerge from recess 16 as it rides up the flared end 17 to engage the lower side of washer member 6, thus preventing further upward movement of handle member 3 with respect to handle member 2, the washer being held in fixed position by the presence of nut 10.

Referring now to FIGS. 3 and 4 of the drawings, there is disclosed an extensible handle identical to that shown in FIGS. 1 and 2, except for the limit means. Accordingly, those portions of FIGS. 3 and 4 which are identical to FIGS. 1 and 2 bear the same reference numerals, while the limiting means of FIGS. 3 and 4 bear individual reference numerals.

The limit means of FIGS. 3 and 4, generally indicated at 19, comprises a contraction ring 20 seated in an annular depression 21 in the upper end of bore 18 on handle member 2, the contraction ring being normally held in an expanded condition in the depression by the handle member 3 when the handle member 3 is disposed in any extended position with respect to handle member 2 other than the upper limit position. A depression in the form of an annular neck portion 22 is provided on the lower end of handle member 3, and includes a downwardly and inwardly tapered portion 23 merging with a sharply curved outwardly extended catch portion 24. In this application, the term contraction ring refers to an annular member exerting a radially inward contracting force when subject to the stress of an externally applied radially expanding force.

In the operation of limit means 19, when the member 3 is extended to position the neck portion 22 adjacent the contraction ring 20, as shown in FIG. 4, the contraction ring contracts as the tapered portion 23 is moved past the contraction ring 18 so that the ring 20 partially protrudes from the depression 21 to finally engage with the catch portion 24, thus prohibiting further upward movement of handle member 3 with respect to handle member 2. Alternatively, when handle member 3 is moved downwardly from the upper limit position with respect to handle member 2, the tapered portion 23 of neck portion 22 provides a camming action to urge contraction ring 18 into depression 21 in the upper end of handle member 2, thus releasing handle member 3 for uninhibited downward movement with respect to handle member 2.

Having now described the invention, what I claim as new and desire to secure by Letters Patent, is:

1. An extensible handle comprising:
   (a) a first elongated cylindrical handle member having an axial bore therein,
   (b) a second cylindrical handle member axially and slidably received in said bore for telescoping coaction with said first member,
   (c) thread means on the outer periphery of said first handle member at the end receiving said second handle member,
   (d) a washer sleeved over said second handle member and disposed in engagement therewith over said bore, and having an outside diameter less than that of said thread means,
   (e) means sleeved over said second handle member in engagement with said washer and operable when radially stressed toward said second member to frictionally grip said second member, and operable when unstressed to release said second member,
   (f) a nut member having a threaded axial bore for coaction with said thread means on said first member for axial movement relative thereto and having a counterbore sleeved on said second member,
   (g) said nut member having a sloping wall between said bore and said counterbore and engageable with said means sleeved over said second handle member to act as a cam means cooperating with the washer member to provide a radially and inwardly stressing force on said means sleeved over said second handle member when the nut is moved toward the first member on the thread means,
   (h) a first depression in said bore in said first member and communicating with the end surface of said first member to underlie said washer member,
   (i) a second depression in the outer periphery of said second member for lateral juxtaposition with said first depression when the members are relatively fully extended,
   (j) spring means in one of said first and said second depressions and biased to partially enter the depression in the other of said first and second depressions when said depressions are laterally juxtaposed to prevent further extension of said handle members,
   (k) said other depression having one wall sloping axially of the telescopic movement to act as cam means urging said spring into said one depression as the handle members are retracted from the fully extended position.

2. The extensible handle, as recited in claim 1, in which said one depression comprises said first depression means.

3. The extensible handle recited in claim 2 in which said spring means comprises an expansion ring.

4. The extensible handle member, as recited in claim 1, in which said one depression comprises said second depression means.

5. The extensible handle recited in claim 4 in which said spring means comprises a contraction ring.

References Cited

UNITED STATES PATENTS

| 1,508,026 | 9/1924 | Noble. | |
| 1,557,923 | 10/1925 | Carroll. | |
| 1,735,949 | 11/1929 | Brady | 248—411 X |
| 2,125,677 | 8/1938 | Kuchenmeister | 285—321 X |
| 2,382,291 | 8/1945 | Carlberg | 287—58 |
| 2,620,025 | 12/1952 | Powers | 287—58 X |
| 3,024,052 | 3/1962 | Oliveau | 287—119 |
| 3,272,538 | 9/1966 | Bergstrom | 285—321 X |

FOREIGN PATENTS

| 392,629 | 3/1924 | Germany. |
| 405,461 | 8/1943 | Italy. |

CARL W. TOMLIN, *Primary Examiner.*

EDWARD C. ALLEN, *Examiner.*

A. V. KUNDRAT, *Assistant Examiner.*